United States Patent [19]

Van Zee

[11] Patent Number: 5,301,495

[45] Date of Patent: Apr. 12, 1994

[54] UNIDIRECTIONAL DRUM ROLLER FOR A BALER OF LARGE CYLINDRICAL BALES

[75] Inventor: Daryl W. Van Zee, Pella, Iowa

[73] Assignee: Vermeer Manufacturing Company, Pella, Iowa

[21] Appl. No.: 850,983

[22] Filed: Mar. 12, 1992

[51] Int. Cl.⁵ ............................................. A01D 39/00
[52] U.S. Cl. .......................................... 56/341; 100/88
[58] Field of Search .............................. 56/341; 100/88

[56] References Cited

U.S. PATENT DOCUMENTS

| | | | |
|---|---|---|---|
| 4,182,101 | 1/1980 | Gaeddert et al. | 56/341 |
| 4,782,652 | 11/1988 | White | 56/341 |
| 4,910,949 | 3/1990 | Meyer | 56/341 |
| 5,181,461 | 1/1993 | Viaud | 56/341 X |

Primary Examiner—David J. Bagnell
Attorney, Agent, or Firm—Kent A. Herink; Brian J. Laurenzo; Brett J. Trout

[57] ABSTRACT

A unidirectional drum roller for a baler of large cylindrical bales. A plurality of ramped steps extend longitudinally along the periphery of a substantially cylindrical drum. Each ramped step includes a steeply inclined leading edge portion and a gradually inclined following portion. The unidirectional construction provides a drum roller which has aggressive feeding action but allows a counter-rotating forming bale to slip past in the non-driven direction. The ramped steps are formed from a single sheet of material by die stamping so that there are no crevices or interstices on the drum roller to trap crop material and the drum roller is essentially self-cleaning.

3 Claims, 2 Drawing Sheets

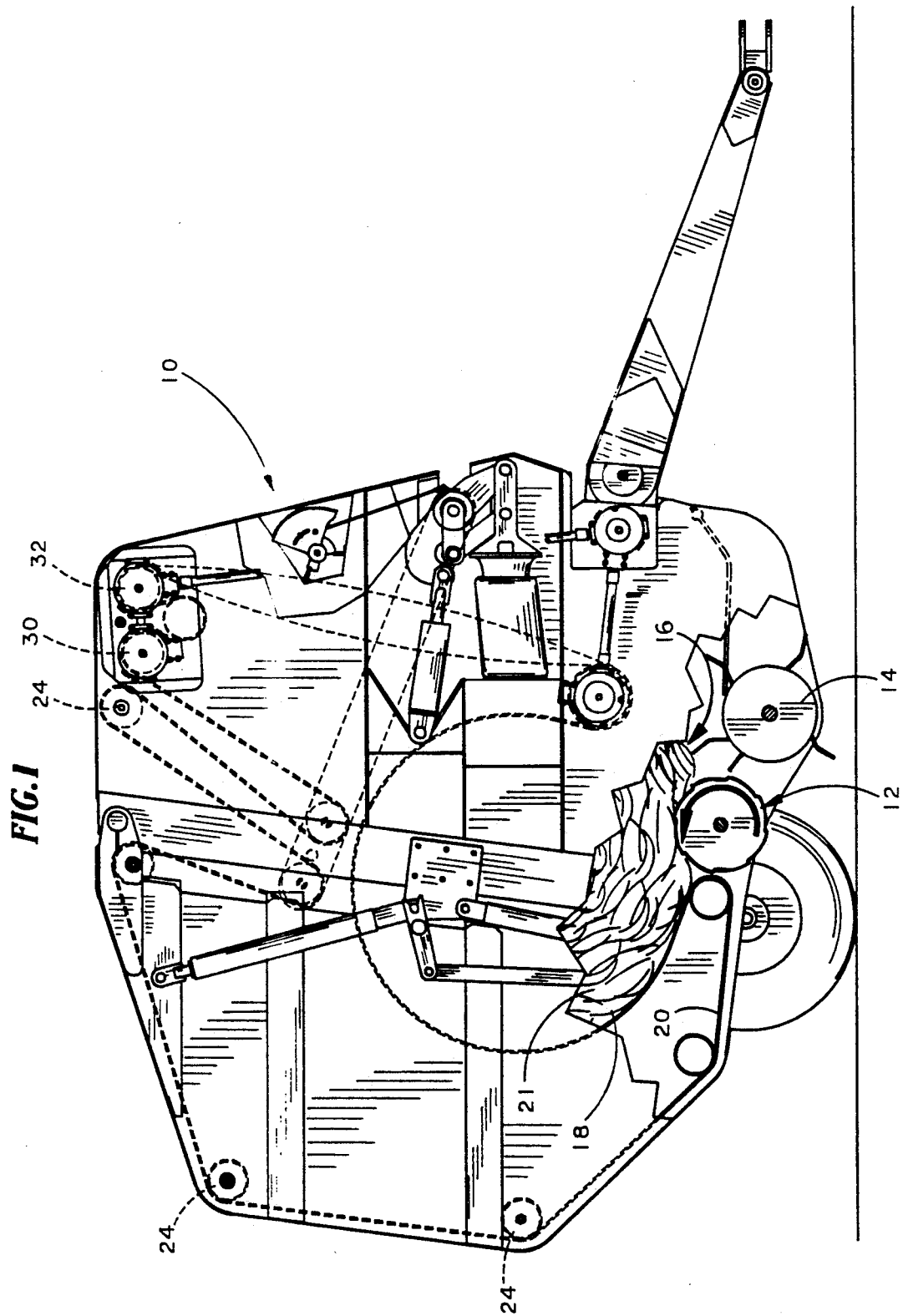

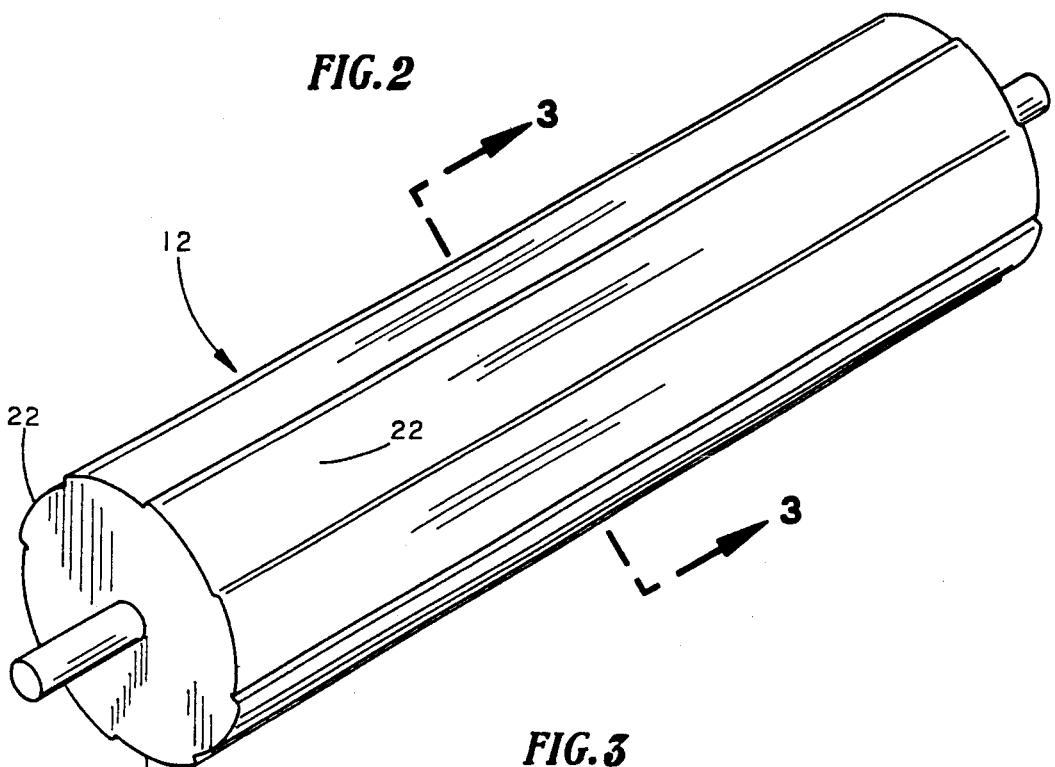
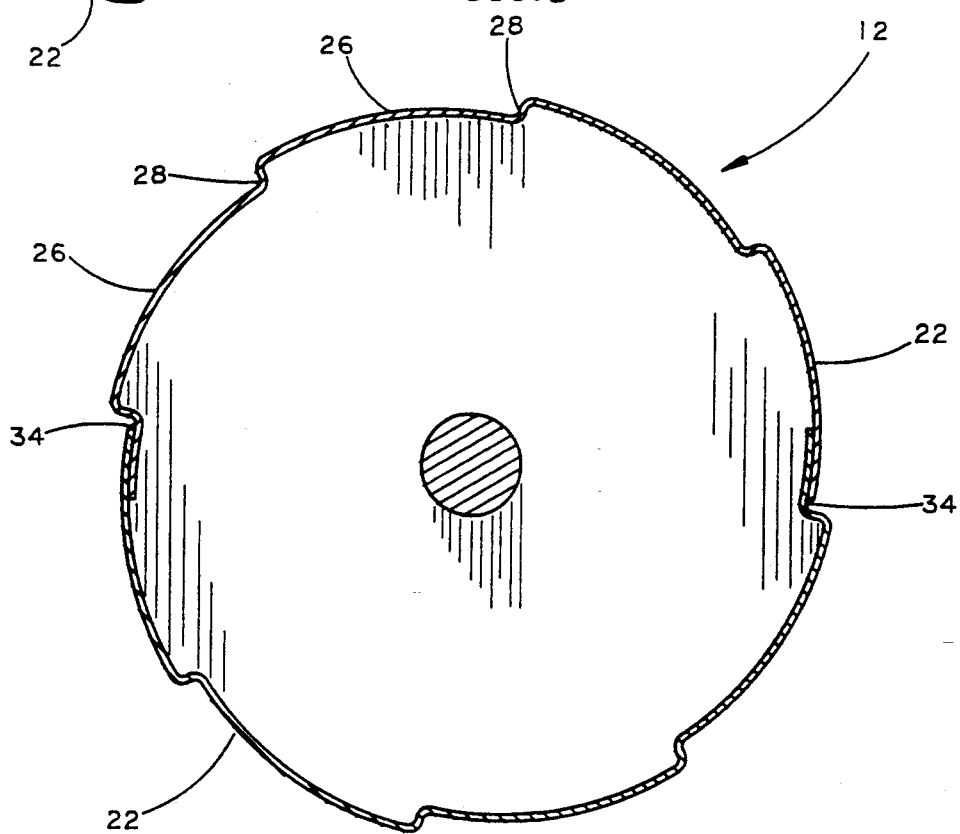

UNIDIRECTIONAL DRUM ROLLER FOR A BALER OF LARGE CYLINDRICAL BALES

BACKGROUND OF THE INVENTION

The invention relates generally to balers of large round bales and, more specifically, to a drum roller which assists in the support and rotation of a large cylindrical bale forming in the baling chamber of a baler.

The baling industry was revolutionized in recent years by the introduction of baling machines that form large cylindrical bales of crop material having a diameter of up to about six feet and a length of up to about five feet. An example of such a baler is taught in U.S. Pat. No. 4,172,354. As is typical in such balers, the '354 patent teaches the use of a plurality of endless belts in a transversely spaced relation across the width of the baler to define a bale forming chamber. Crop material picked up by the baler is directed into a starting chamber where the material initially forms into a full width cylinder of small diameter. As additional crop material is added to the starting bale, the bale grows into the main baling chamber where it is at least partially supported and rotated by a drum roller. The drum roller is driven at a rotational speed such that its outer peripheral surface in contact with the forming bale moves at the same speed as the bale-contacting surface of the plurality of belts.

In known balers, a plurality of raised, engagement members attach to the outer peripheral surface of the drum roller to assist in engaging and aggressively rotating the forming bale. For example, in the '354 patent, a plurality of longitudinal rods are welded to the surface of the drum roller to act as the raised, engagement members. Such drum rollers work well when the baler is acting substantially as designed and the drum roller is coordinated with the belts. In actual practice, however, the speed of the belts may vary substantially due to accumulation of crop materials or other substances on the support rollers about which the belts are trained or the effective diameter of the drum roller will vary with the crop materials. Not infrequently, the belts speed is greater than the effective surface speed of the drum roller so the bale is counter-rotated with respect to the drum roller. This results in stress and additional loads being imposed on the belt and drum roller drive system with concomitant losses of energy efficiency and drive train lifetime.

Known drum rollers also suffer from the disadvantage of trapping and accumulating crop material in the raised, engagement members. Such trap material reduces the aggressive engagement action of the drum roller.

SUMMARY OF THE INVENTION

The invention consists of a unidirectional drum roller for balers of large cylindrical bales. The drum roller is formed with a plurality of ramped steps on its outer peripheral surface, these steps have a steep, substantially radial leading edge portion and a gradually inclined, substantially arc-shaped following portion. The drum roller is rotated in a direction so that the leading edge portion of the steps aggressively engage the surface of a bale forming in the baler. If for some reason the baler becomes uncoordinated and the bale is being rotated at a speed greater than the rotational speed of the drum roller, the unidirectional construction of the drum roller will allow the counter rotating bale to slip on the gradually inclined, following portions of the step members. Additionally, the step members are formed of a continuous sheet so that there are no crevices or interstices for capturing crop material. The unidirectional drum roller is, accordingly, self cleaning.

The unidirectional drum roller is easily and efficiently manufactured from sheet stock material by die-stamping. A die is constructed to deform the sheet material at the location of the leading edge portion of each step. Each stamping process adds a degree of curvature to the sheet material. A die is constructed such that four stamping processes of four leading edge portions results in the sheet material having a semi-circular transverse cross section. Two such sections are joined edge to edge to form the cylindrical drum roller.

An object of the invention is to provide a unidirectional drum roller for a baler of large cylindrical bales which has aggressive feeding or engagement action in the driven direction and which allows a counter rotating forming bale to slip past in the non-driven direction.

Another object of the invention is to provide a unidirectional drum roller which is self-cleaning.

A further object of the invention is to provide a drum roller that is simple and economical to manufacture.

These and other objects of the invention will be obvious to one skilled in the art upon review of the following description of the invention.

BRIEF DESCRIPTION OF THE DRAWINGS

FIG. 1 is a side view of a baler of large cylindrical bales with parts broken away to show the unidirectional drum roller of the present invention;

FIG. 2 is a perspective view of the unidirectional drum roller; and

FIG. 3 is a cross-sectional view taken along the line 3—3 of FIG. 2.

DETAILED DESCRIPTION OF A PREFERRED EMBODIMENT

FIG. 1 illustrates, generally at 10, a baler that forms large round bales in which the present invention, a unidirectional drum roller 12, is installed. A crop pickup mechanism 14 on the baler picks up crop material and feeds the material into a starting chamber 16 where a full width bale begins to form. A plurality of endless belts 20 are trained about a plurality of support rollers 24 and rotate the forming bale as additional crop material is added. As the forming bale increases in diameter, it expands into a main baling chamber 18. The outer peripheral surface of the drum roller 12 is in contact engagement with the bale and partially supports the bale 21. The drum roller 12 is rotated by a drive train of the baler 10 in the direction of the arrow of FIG. 1 to assist in rotating the bale 21 within the baling chamber 18. The outside periphery of the unidirectional drum roller 12 is rotated by a drive train of the baler 10 at approximately the same speed as the contact surface of plurality of belts 20.

The unidirectional construction of the drum roller 12 provides aggressive feeding action for bale rotation. A plurality of ramped steps 22 extend longitudinally along the surface of the drum roller 12 (FIG. 2). Each step 22 has a steeply inclined, substantially radial leading edge portion 28 and a gradually inclined, arc-shaped following edge portion 26 (FIG. 3). A following edge portion 26 of one step extends from the outer edge of one of the leading edge portions to the inward edge of the next adjacent and following leading edge portion. The leading edge portion 28 aggressively turns the bale as the unidirectional drum roller 12 rotates.

The unidirectional construction of the drum roller 12 also reduces stress to the belt drive train and drum roller system that may be caused by a bale that is counter-rotating relative to the drum roller 12. The endless belts 20 are trained about a pair of drive rollers 30 and 32 which frictionally engage and drive the belts 20. In normal operation, the outer periphery of the drive rollers 30 and 32 are driven at approximately the same speed as the outer periphery of the drum roller 12 such that the drive train is coordinated. Crop material and other substances at times accumulate on the drive rollers 30 and 32. This accumulation increases the effective diameter of the drive rollers 30 and 32 and thereby causes the belts 20 to rotate the bale 21 at a speed greater than that of the drum roller 12. The bale 21 then is counter-rotating relative to the drum roller 12. A relatively counter-rotating bale can slip along the following edge portion 26 on the drum roller 12 reducing any stress that might occur to the baler 10 as it works against the counter-rotating bale. The effective diameter of drum rollers also changes with variations in crop material. Softer materials will tend to conform more closely with the variations in diameter of the drum roller than will harder or more rigid materials. The effective diameter of drum rollers, accordingly, is less with softer, more compliant material than with stiffer material. This will tend to result in the belts overrunning the drum roller.

The unidirectional drum roller 12 is manufactured by die-stamping metal sheet stock material. The die deforms the sheet metal at the location of the leading edge portion 28 of each step 22. Each stamping process adds a degree of overall curvature to the sheet material. In the preferred embodiment, the die is constructed so that four stamping processes producing four stamped steps 22 provide a longitudinal section of a cylinder that is a semi-circular arc. Two sections are smoothly joined as by weldments 34 (FIG. 3) form the cylindrical drum roller 12 having eight ramped steps 22 along its periphery. Since the ramped steps 22 are stamped from a continuous sheet, the crevices or joints of the known drum rollers which tend to catch crop material are eliminated and the drum roller 12 is essentially self-cleaning. Of course, the drum roller 12 could be constructed of a single sheet of stock material or any other small integer number of sheets to accommodate diverse manufacturing or other considerations.

Although the invention has been described with respect to a preferred embodiment thereof, it is to be also understood that it is not to be so limited since changes and modifications can be made therein which are within the full intended scope of this invention as defined by the appended claims.

I claim:

1. A unidirectional drum roller for a baler of cylindrical bales, comprising:
   (a) a substantially cylindrical drum; and
   (b) a plurality of ramped steps extended longitudinally of said drum, each of said ramped steps including a steeply inclined leading edge portion and a gradually inclined following portion.

2. A unidirectional drum roller as defined in claim 1, wherein said leading edge portion is substantially radial.

3. A unidirectional drum roller as defined in claim 1, wherein said ramped steps comprise the outer peripheral surface of said drum, each following portion being extended from the outer edge of a leading edge portion to the inward edge of a next adjacent and following leading edge portion.

* * * * *